US007536464B1

(12) United States Patent
Dommety et al.

(10) Patent No.: US 7,536,464 B1
(45) Date of Patent: May 19, 2009

(54) METHODS AND APPARATUS FOR PERFORMING LAYER 2 AUTHENTICATION AND SERVICE SELECTION IN SSG BASED NETWORKS

(75) Inventors: Gopal Dommety, San Jose, CA (US); Ashoka Kallappa, Bangalore (IN); Navneet Agarwal, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 915 days.

(21) Appl. No.: 10/672,857

(22) Filed: Sep. 25, 2003

(51) Int. Cl.
G06F 15/16 (2006.01)
G06F 15/173 (2006.01)
H04L 9/00 (2006.01)
H04W 4/00 (2006.01)

(52) U.S. Cl. .................. 709/228; 709/225; 713/151
(58) Field of Classification Search .............. 713/151; 709/225, 228; 370/331
See application file for complete search history.

(56) References Cited

U.S. PATENT DOCUMENTS

2004/0098588 A1* 5/2004 Ohba et al. ............... 713/169
2004/0193712 A1* 9/2004 Benenati et al. ........... 709/225

OTHER PUBLICATIONS

Droms et al. Network Working Group. "RADIUS Attributes Sub-option for the DHCP Relay Agent Information Option". Feb. 14, 2002. <http://www.freeradius.org/rfc/draft-ietf-dhc-agentopt-radius-00.txt>.*
Livingston, Rigney. "Radius Accounting" RFC 2866. Jun. 2000. <http://www.ietf.org/rfc/rfc2866.txt>.*

C. Perkins, Ed, "IP Mobility Support," RFC 2002, Oct. 1996.
B. Aboba, et al, "The Network Access Identifier," RFC 2486, Jan. 1999.
C. Rigney et al, "Remote Authentication Dial In," RFC 2138, Apr. 1997.
D. Carrel et al. "The TACACS+ Protocol Version 1.78," http://www.ietf.org/internet-drafts/draft-grant-tacacs-02.txt, Internet Draft, Jan. 1997.
H. Haverinen et al, "EAP SIM Authentication," draft-haverinen-pppext-eap-sim-11.txt, Internet Draft, Jun. 2003.
"Cisco ITP Map Gateway for Public WLAN SIM Authentication and Authorization," White Paper, http://www.cisco.com/en/US/products/sw/wirelessw/ps1862/products_white_paper0918a00 . . . , downloaded on Sep. 8, 2003, 11 pages.
"Introduction to SESM Network Components," http://216.239.57.104/search?q=cache:11JhtgQtGLcJ:www.cisco.com/univercd/cc/td/doc/solution/sesm/sesm_319/deply/lintro.htm+ssg+based+network . . . , downloaded on Jul. 21, 2003, 9 pages.
IEEE Standard 802.1X-2001 for Local and Metropolitan Area Networks—Port-Based Network Access Control, Jun. 14, 2001, 142 pages.

* cited by examiner

*Primary Examiner*—Ario Etienne
*Assistant Examiner*—Philip J Chea
(74) *Attorney, Agent, or Firm*—Weaver Austin Villeneuve & Sampson LLP (57) ABSTRACT

Methods and apparatus are disclosed for performing layer 2 authentication of a Mobile Node supporting Mobile IP in an SSG based network. Layer 2 information including at least one of a MAC address and username associated with the Mobile Node is obtained. An orphaned host object including the layer 2 information (e.g., MAC address) is then generated. The orphaned host object is then unorphaned when an IP address associated with the layer 2 information (e.g., MAC address) is received such that the unorphaned host object includes the IP address and the layer 2 information.

23 Claims, 9 Drawing Sheets

FIG._1

Prior Art

| 700 Network Device | 702 Clients | |
|---|---|---|
| IP Address | IP Address(es) | MAC Address(es) |
|  |  |  |

METHODS AND APPARATUS FOR PERFORMING LAYER 2 AUTHENTICATION AND SERVICE SELECTION IN SSG BASED NETWORKS

BACKGROUND OF THE INVENTION

1. Field of the Invention

The present invention relates to Mobile IP network technology. More particularly, the present invention relates to performing layer 2 authentication in SSG based networks.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

Figure 1:
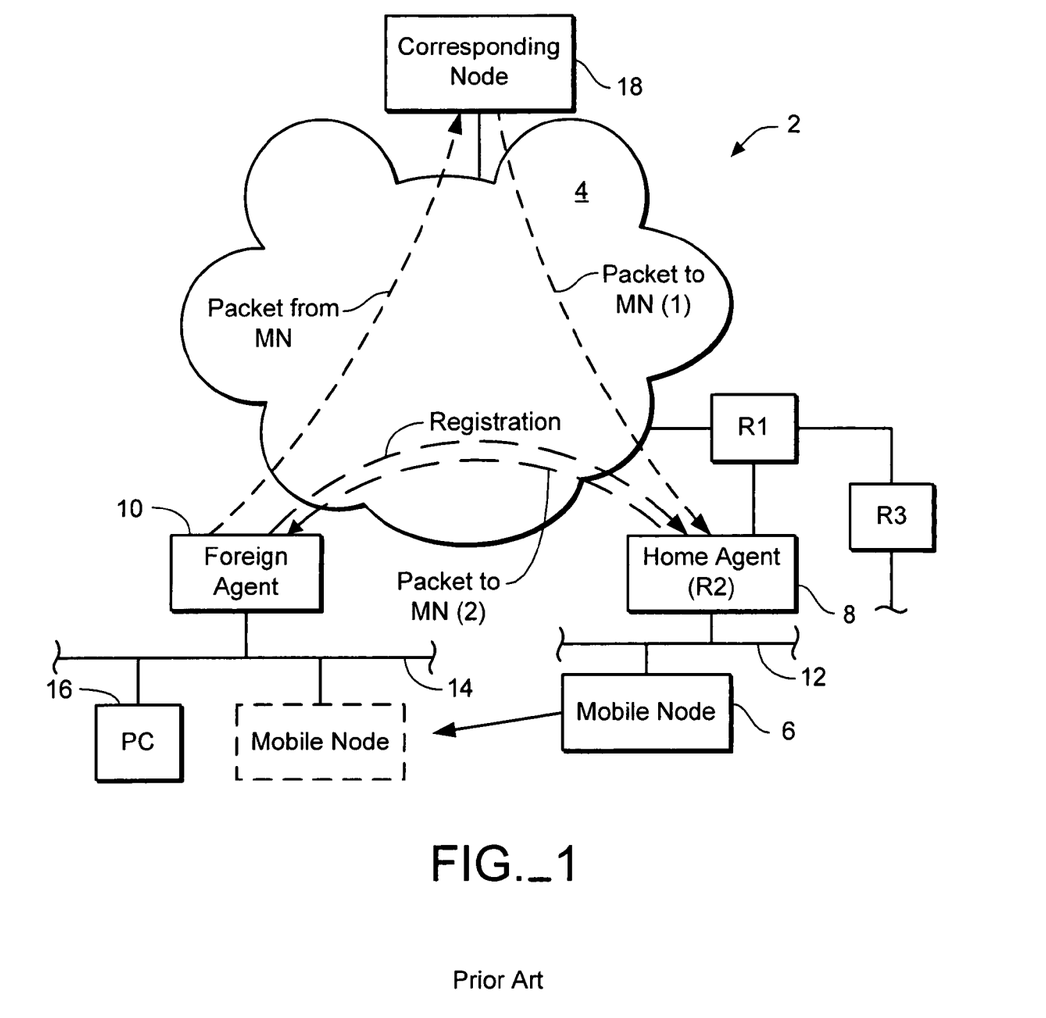
FIG. 1 is a diagram illustrating a Mobile IP network segment and associated environment.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4. Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. An output message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

Various systems may be used for authentication of the Mobile Node. For instance, a service selection gateway (SSG) such as that available from Cisco Systems, located in San Jose, Calif., may perform authentication and service connection tasks on behalf of a Subscriber Engine Services Manager (SESM). SESM solutions interact with and apply policy control to gateway components for subscriber service based solutions at the edge of a network. An SSG based network typically includes two components. First, an SSG router enables a user to connect to the SSG based service provider network by providing authentication, service connection, connection management, and SESM session capabilities. Second, a SESM performs authentication of the user, policy enforcement, service selection and enforcement of services (e-mail, VPN, etc.), and billing. In this manner, a Mobile Node may be provided access to different services and can be billed for the services accessed.

In an SSG based system, the user identity and access to services is based upon the IP address of the user. This IP address-based system worked well for HTTP based authentication, since HTTP packets include the IP address of the sender and receiver of the HTTP packets in the HTTP header. In addition, this type of IP address-based system also worked well in systems in which the IP address is known during authentication (i.e., layer 3 authentication). However, in systems (e.g., EAP-SIM, LEAP) in which the IP address is unknown during the process of layer 2 authentication, another type of authentication (e.g., layer 3 authentication) needs to occur. Unfortunately, the SSG based network cannot correlate the layer 2 information with the layer 3 information. As a result, this second layer of authentication requires the user to enter identifying information such as a password to enable the SSG based network to correlate this layer 2 and layer 3 information.

Figure 2:
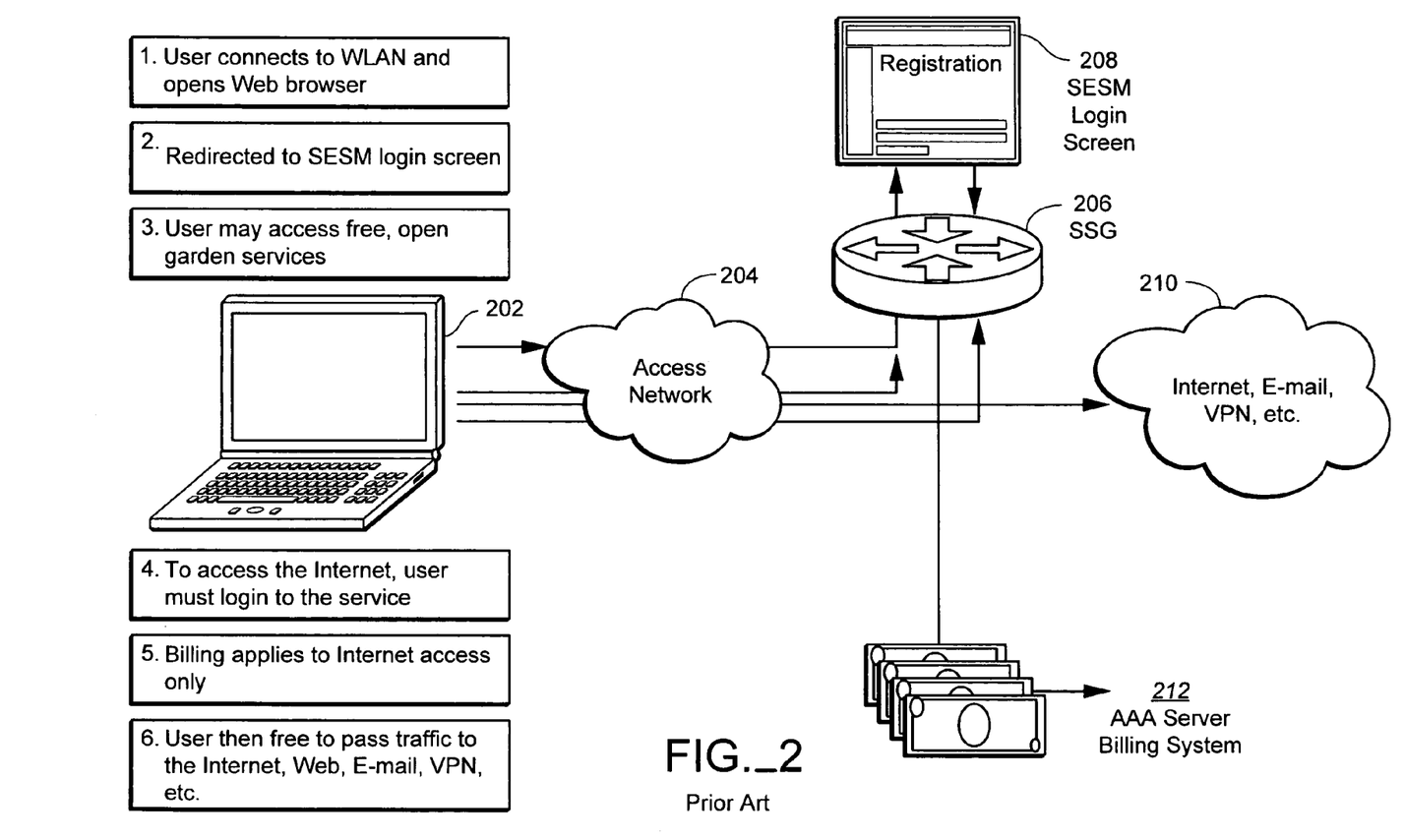
FIG. 2 is a diagram illustrating conventional layer 3 authentication resulting in presentation of a SESM login screen to the user in SSG based networks.

FIG. 2 is a diagram illustrating conventional layer 3 authentication resulting in presentation of a SESM login screen to the user in SSG based networks. When a Mobile Node 202 connects to an SSG-based network 204, the user connects to the WLAN and opens a Web browser. The user is then redirected to a SESM login screen 208 by a SSG router 206. Thus, in order to access various services 210, such as the Internet, e-mail, or the virtual private network (VPN), the user must typically login to the service by entering a username and password. The user may then be billed for various services accessed via a AAA server 212. Since the additional web page is generally provided to the user to obtain the user's username and password, the conventional method of authentication in a SSG network is not user friendly. For instance, this type of access would be undesirable in a situation in which a user is using a cell-phone.

In view of the above, it would be beneficial if double authentication could be eliminated in a network such as a SSG based network. It would also be desirable to enable layer 3 policies to be enforced based upon layer 2 authentication.

SUMMARY OF THE INVENTION

Methods and apparatus are disclosed for performing layer 2 authentication, thereby enabling service selection in an SSG based network. This is accomplished by obtaining layer 2 information (e.g., MAC address and/or username), which is later mapped to layer 3 information (e.g., IP address). In this manner, layer 3 policies may be enforced without performing layer 3 authentication.

In accordance with one aspect of the invention, layer 2 information such as a MAC address and/or username associated with the Mobile Node is obtained. An orphaned host object including the layer 2 information is then generated. The orphaned host object is then unorphaned when an IP address associated with the layer 2 information is received such that the unorphaned host object includes the IP address and the layer 2 information. Layer 3 policies based upon IP address may therefore be enforced through accessing the unorphaned host object.

In accordance with another aspect of the invention, the orphaned object is unorphaned by mapping the layer 2 information with the layer 3 information. Specifically, the orphaned host object is unorphaned by mapping the layer 2 information to the IP address. For instance, the unorphaning of the orphaned host object may be triggered through the receipt of a packet (e.g., ACCT start packet) including the IP address and layer 2 information associated with the Mobile Node. In this manner, layer 3 policies based upon the IP address may be enforced based upon layer 2 authentication.

In accordance with yet another aspect of the invention, the host object(s) associated with a network device supporting the associated Mobile Node(s) are placed in an inactive state (e.g., orphaned) when the network device fails or is powered down. For instance, a list of network devices (e.g., routers) and their supported Mobile Nodes may be maintained. This list may be updated each time a packet such as an ACCT start packet is received, which identifies the network device as well as the Mobile Node for which accounting is initiated. When a network device such as a DHCP server fails or reboots, the host objects associated with the Mobile Nodes supported by the network device are placed in an inactive state (e.g., through the use of an inactive timer). The failure or rebooting of a network device may trigger the sending of a packet such as an ACCT off or ACCT on packet. Upon expiration of the inactive timer, all inactive host objects may be deleted. Thus, rebooting or failure of a network device such as a DHCP server may result in the deleting of host objects associated with the DHCP server.

In accordance with yet another aspect of the invention, an unorphaned host object is deleted when the Mobile Node's lifetime or DHCP address has expired, or when the Mobile Node has roamed to another location. When this occurs, a packet such as an ACCT stop packet including the IP address of the Mobile Node is received, this triggers the deletion of the host object associated with the Mobile Node.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Figure 3:
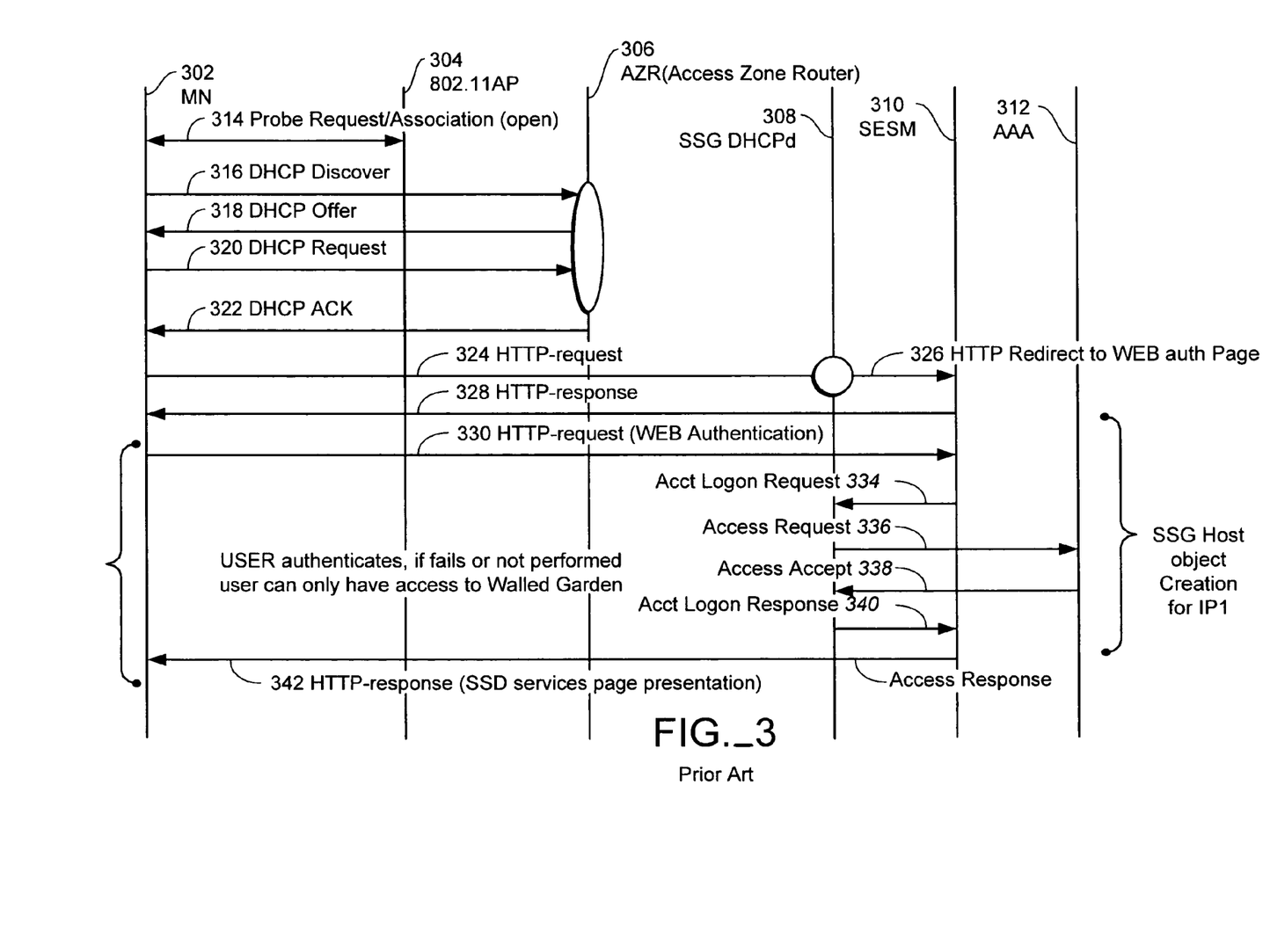
FIG. 3 is a process flow diagram illustrating a conventional method of generating a host object in SSG based networks.

In many SSG-based network systems, layer 2 authentication is not performed. FIG. 3 is a process flow diagram illustrating a conventional method of generating a host object in SSG based networks. The user associates with the wireless local area network (WLAN) in which layer 2 connectivity is established at 314. The Mobile Node sends a DHCP discover packet at 316, receives a DHCP offer at 318, and sends a DHCP request at 320. The Mobile Node is then assigned an IP address when a DHCP ack is received at 322. The Mobile Node can now send packets, even though layer 3 authentication has not occurred.

Typically, the SSG router maintains host objects for the Mobile Nodes it supports. Each host object generally includes layer 2 information such as MAC address and/or username, as well as IP address. However, when layer 2 authentication has not occurred, as in this example, the host object will generally not have been generated by the SSG router. When the SSG router receives a packet such as a HTTP request or TCP packet as shown at 324, it determines from the source IP address of the packet whether the SSG router has a host object for the Mobile Node. If the SSG router does not have a host object for the Mobile Node, it redirects the web traffic to the SESM at 326.

The SESM provides a login screen to the user at 328 via a HTTP response, receives the username and password or other identifying information at 330 via a HTTP request, and validates the user based upon the information provided.

The SESM then sends an account logon request for the user including user credentials such as usemrname and password to the SSG router at 334.

The SSG router then composes an access-request message with identifying information (e.g., Network Access Identifier) at 336 to a AAA server to initiate billing for the requested service. RFC 2486 of the Network Working Group, January 1999, proposes syntax for the Network Access Identifier (NAI), the userID submitted by a client during Point to Point Protocol (PPP) authentication. Thus, when a client is authenticated based upon the NAI, an IP address may be allocated for use by the client.

The AAA represents authentication, authorization, and accounting. Various protocols such as the Remote Authentication Dial In User Service (RADIUS) and TACACS+ may be implemented to provide such a server. Note that the device providing accounting information to the server must provide communications in formats required by the AAA server protocol. RFC 2138 describes the RADIUS Protocol and is hereby incorporated by reference. Similarly, RFC 1492 describes TACACS and the Internet-Draft "The TACACS+ Protocol Version 1.78," available at http://www.ietf.org/internet-drafts/draft-grant-tacacs-02.txt, describes TACACS+. Both of these documents are incorporated herein by reference for all purposes.

Upon authentication of the Mobile Node, the AAA server sends an access accept/response including user profile information to the SSG router at 338 indicating that billing is initiated. In this manner, the AAA server informs the SSG router that the user is authenticated. The SSG router then creates a host object for the Mobile Node. The SSG router then sends an account logon response to the SESM at 340 to indicate that the services can be provided to the Mobile Node. The SESM then transmits a HTTP response at 342 including a web page presenting services from which the Mobile Node can select and access.

Figure 4:
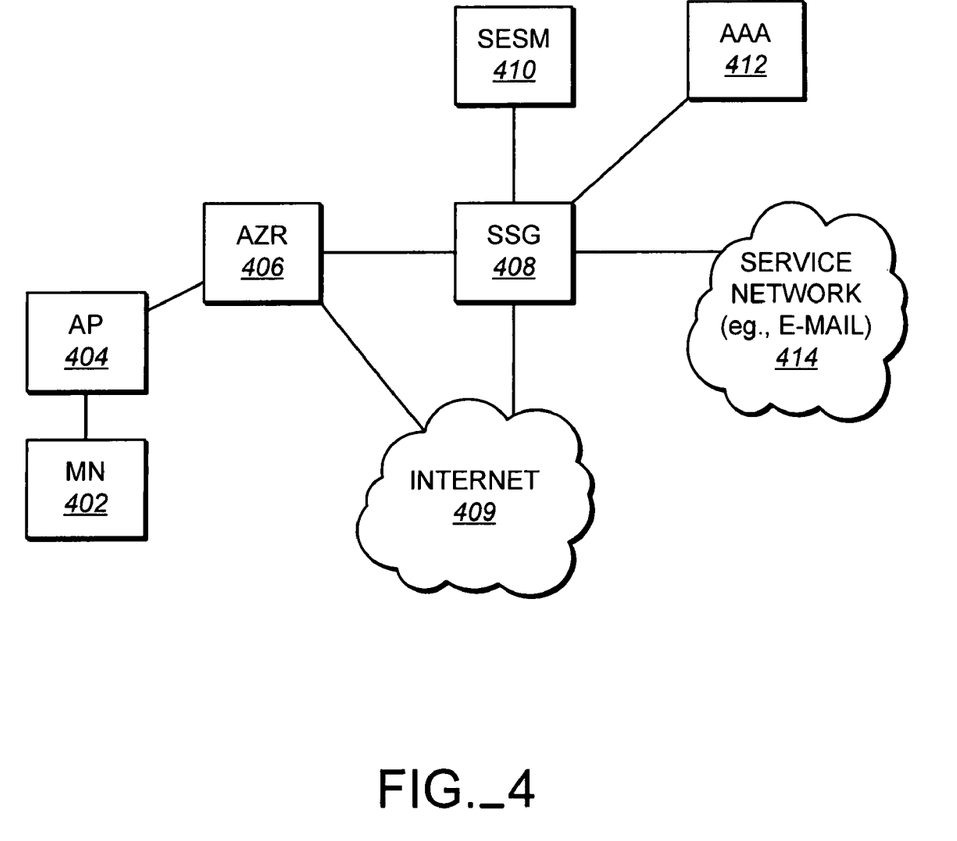
FIG. 4 is a system block diagram illustrating a system in which various embodiments of the invention may be implemented in SSG based networks.

FIG. 4 is a system block diagram illustrating an exemplary system in which various embodiments of the invention may be implemented in SSG based networks. In the following description, the present invention is implemented in a wireless network. However, although the present invention is described as being implemented in a wireless network, the present invention may also be implemented in a non-wireless network. As shown, a Mobile Node 402 may wish to roam from its Home Agent to an Access Point (AP) 404.

In a wireless network, each Access Point 404 may be coupled to a Foreign Agent (not shown) as well as an Access Point. By way of example, in a wireless network, each Access Point may have an antenna and receiver for receiving packets. As yet another example, the Access Points may designate connection points in a non-wireless network. Typically, a Mobile Node implementing Mobile IP registers and de-registers with its Home Agent through the registration process.

In order to access services in an SSG-based network, authentication of the Mobile Node must occur. An Access Zone (AZ) router 406 serves as an intermediary that assigns an IP address to the Mobile Node. The AZ router 406 acts as a DHCP server. Therefore, the AZ router 406 assigns the IP address to the client and sends an ACCT start message to the SSG router 408. The AZ router 406 sends an ACCT stop message to the SSG router when the IP address is released or the lease timer has expired. The AZ router 406 also initiates the activation of a host object by the SSG router 408 as well as deactivation of the host object by the SSG router 408, as will be described in further detail below. As shown, the AZ router 406 and SSG router 408 may communicate directly, or via the Internet 409. The SESM 410 therefore operates to enable service selection by the Mobile Node upon authentication of the Mobile Node without requiring a secondary authentication process. The AAA server 412 operates to support billing for the Mobile Node for services that have been selected and provided via service network 414.

As described above, layer 2 authentication may not be performed prior to layer 3 authentication. However, in other types of systems, such as PPP or EAP-SIM, layer 2 authentication is performed prior to layer 3 authentication. In accordance with various embodiments of the invention, this layer 2 and layer 3 information is correlated through the generation of an orphaned host object.

Figure 5:
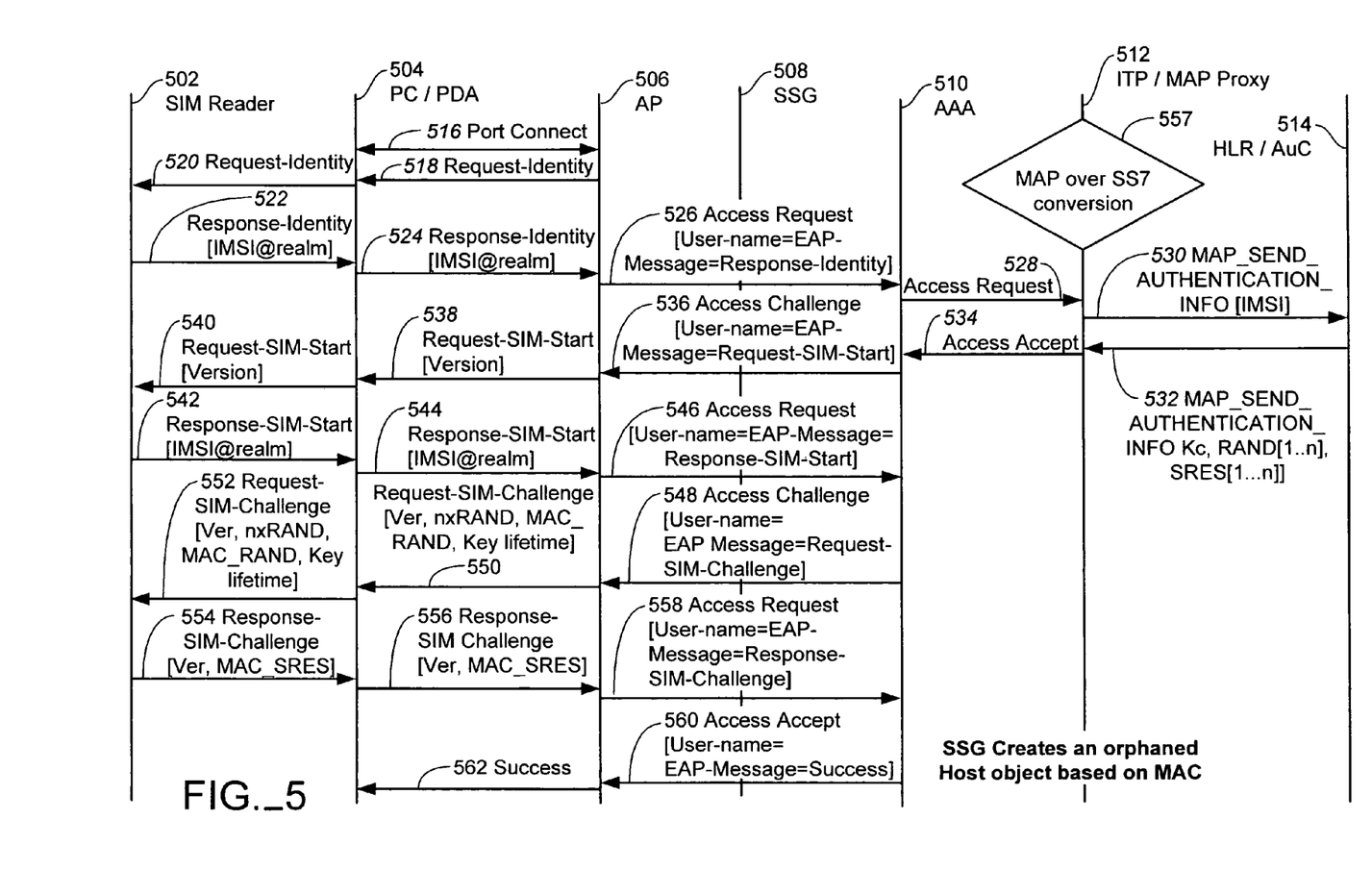
FIG. 5 is a process flow diagram illustrating a method of generating an orphaned host object based upon a MAC address in accordance with various embodiments of the invention.

FIG. 5 is a process flow diagram illustrating a method of generating an orphaned host object based upon a MAC address or other layer 2 information in accordance with various embodiments of the invention. In this example, the Extensible Authentication Protocol (EAP) method for authentication using the Global System for Mobile Communications (GSM) Subscriber Identity Module (SIM) and standard GPRS Security and Mobility Management(GMM) messages (EAP-SIM) protocol is used to authenticate the Mobile Node. The Internet Draft entitled "EAP SIM Authentication," submitted to the Point-to-Point Extensions Working Group by H. Haverinen and J. Salowey, dated June 2003, is incorporated herein by reference for all purposes.

An increasing number of GSM operators are recognizing the need for high-speed wireless data services. Because proper user authentication has been and will continue to be a key success factor for access to its services, the described embodiments support authentication of WLAN subscribers using the existing and well-proven GSM-based user authentication and existing GSM provisioning facilities.

Recognizing the need to bridge the native WLAN authentication and authorization mechanisms with the existing proven GSM-based authentication and provisioning model, Cisco Systems has introduced the Cisco IP Transfer Point (ITP) Mobile Application Part (MAP) Gateway function. The Cisco ITP MAP Gateway function enables existing GSM service providers to fully integrate 802.11 technology into their existing GSM network using subscriber-identity-mobile (SIM) cards. In this capacity, the Cisco ITP MAP Gateway is part of the Cisco Public WLAN solution architecture.

In accordance with one embodiment, the Cisco MAP Gateway merges both WLAN EAP or 802.1X and GSM SIM authentication mechanisms transparently, so that the mobile node performs SIM authentication to the GSM Authentication Center (AUC) through a standard EAP Remote Access Dial-In User Service (RADIUS)-based authentication. The benefit is that the GSM operator, when implementing WLAN hot spots into the network, can keep the same subscriber provisioning, authentication, and service authorization that are already in place for GSM services.

Given that the WLAN client is equipped with a SIM card and the appropriate SIM card reader, the Cisco ITP MAP Gateway establishes a bridge between the RADIUS-based authentication used in WLAN networks and the SIM-based authentication used in GSM networks. From the standpoint of the GSM Home Location Register (HLR), the Cisco ITP behaves just like another node in the Signaling System 7 (SS7) network. From the RADIUS server standpoint, the Cisco ITP behaves like another RADIUS server.

In this example, the Mobile Node is represented by SIM reader 502 and Personal Computer (PC)/Personal Digital Assistant (PDA) 504. Steps performed by the Access Point (AP), SSG router, AAA server, IP Transfer Point (ITP)/Mobile Application Part (MAP) Proxy, and Home Location Register (HLR)/Authentication Center (AuC) are represented by vertical lines 506, 508, 510, 512, and 514, respectively. Together, the ITP/MAP and HLR/AuC form a Signalling System 7 (SS7) network. The signaling system stores information required to set up and manage telephone calls on the public switched telephone network (PSTN). This information is stored on a network separate from the network that the call was made on. The AAA server communicates with the ITP, which acts as a gateway between the IP and SS7 networks. Using MAP messages, the system gets a user service profile from the subscriber's HLR. In addition, the system's AuC provides authentication and encryption parameters to verify each user's identity and ensure call confidentiality.

First, the PC/PDA establishes port connectivity at 516. The AP then sends a Request-Identity packet at 518, which is forwarded by the PC/PDA at 520 to the SIM reader. The SIM reader then sends a Response-Identity packet at 522 including the NAI (e.g., IMSI@realm) to the PC/PCA, which is forwarded at 524 to the AP. The AP then composes an access request packet including the NAI and/or other identifying information and transmits the access request packet to the AAA server at 526. Upon interception of the access request by the SSG router, the MAC address and/or other layer 2 information such as the usemrname associated with the Mobile Node may be obtained.

In order to authenticate the Mobile Node, the AAA server sends the access request at 528 to a ITP/MAP proxy. The ITP/MAP proxy obtains the identifying information from the access request packet and authenticates the Mobile Node. In accordance with one embodiment, the ITP/MAP proxysends a MAP_SEND_AUTHENTICATION_INFO packet at 530 to a the HLR/AuC in order to obtain authentication and encryption parameters to verify the user's identity and to ensure call confidentiality. The HLR/AuC then sends a MAP_SEND_AUTHENTICATION_INFO packet at 532 to the ITP/MAP proxy including authentication and encryption parameters.

The AAA server then sends an access challenge packet with an EAP-message including a request-SIM-start at 536 to the AP. The AP sends a request-SIM-start packet at 538 to the PC/PDA, which is forwarded to the SIM reader at 540. In response, the SIM reader sends a response-SIM-start packet at 542 including the NAI, which is forwarded at 544 by the PC/PDA to the AP. The AP then sends an access request packet including a AEP-message of response-SIM start at 546 to the AAA server. The AAA server sends an access challenge packet including an EAP-message of request-SIM-challenge at 548 to the AP. The AP sends a request-SIM-challenge packet at 550, which is forwarded to the SIM reader at 552. The SIM reader sends a response-SIM-challenge packet at 554 to the PC/PDA, which is forwarded at 556 to the AP. The AP then sends an access request packet at 558 including an EAP message of Response-SIM-Challenge to the AAA server. The AAA server response by sending an access accept packet at 560 including an EAP message indicating that the authentication was successful. The AP then sends a success packet at 562 to inform the Mobile Node that it has been authenticated.

As described above, the SSG router generates an orphaned host object based on the layer 2 information (e.g., MAC address). The SSG router 508 preferably intercepts packets sent by the AP to the AAA server, and by the AAA server to the AP. Thus, the SSG router 508, preferably generates the orphaned host object upon interception of the access accept packet (i.e., access reply packet) at 560 indicating that the Mobile Node associated with the MAC address has been authenticated by a AAA server. Thus, the orphaned host object will include the MAC address and/or other layer 2 information (e.g., username) of the Mobile Node after layer 2 authentication has occurred. The orphaned host object is then unorphaned when layer 3 information such as an IP address associated with the MAC address is received such that the unorphaned host object includes the IP address and the MAC address (and/or other layer 2 information).

Figure 6:
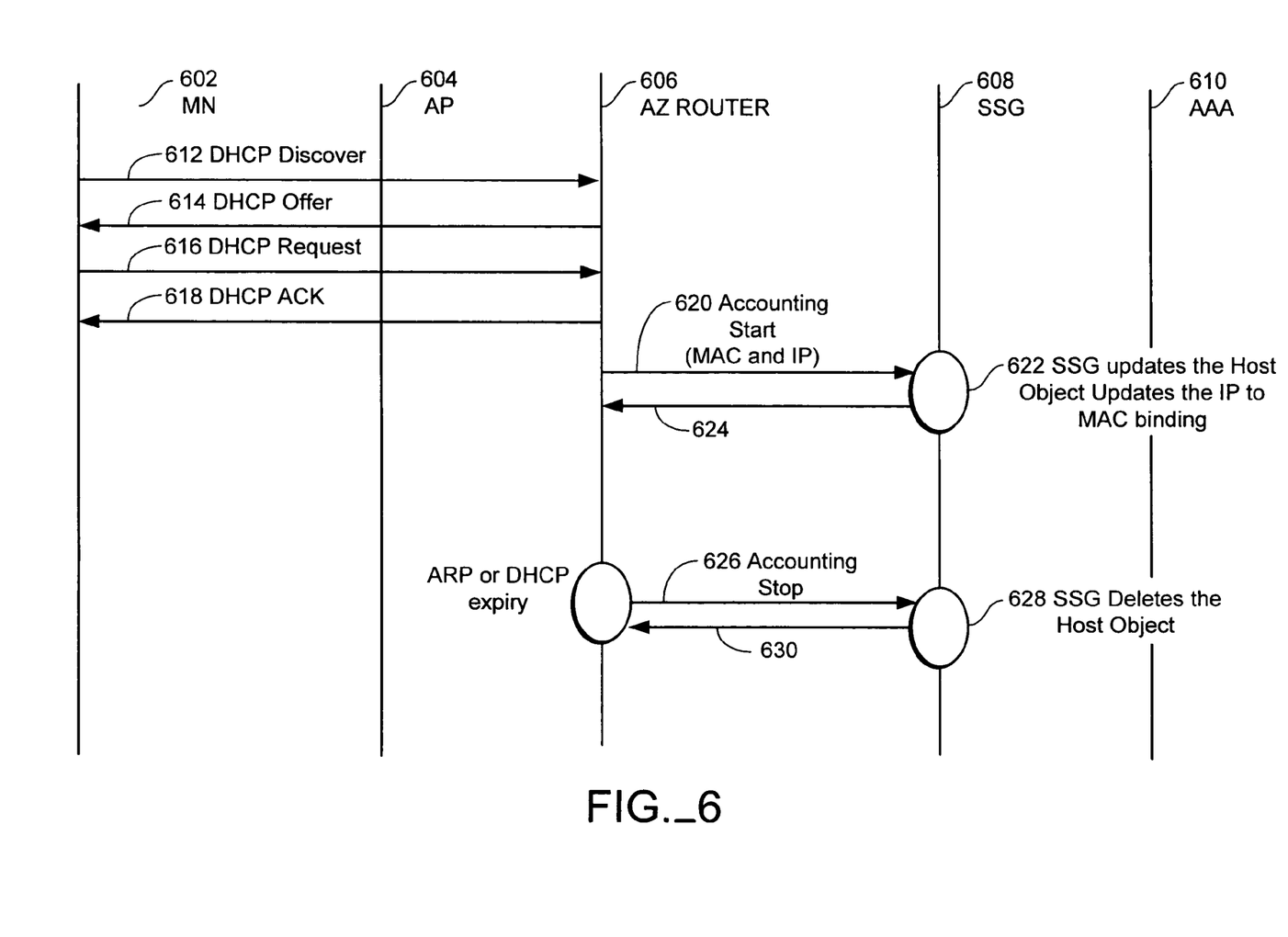
FIG. 6 is a process flow diagram illustrating a method of unorphaning a host object in accordance with various embodiments of the invention.

FIG. 6 is a process flow diagram illustrating a method of unorphaning a host object in accordance with various embodiments of the invention. Steps performed by the Mobile Node, AP, Access Zone Router (AZ Router), SSG router, and AAA server are represented by vertical lines 602, 604, 606, 608, and 610, respectively. In order to unorphan the host object, the SSG router creates a binding between the IP address and the MAC address. The Mobile Node may be assigned an IP address via a DHCP server. Specifically, the Mobile Node sends a DHCP discover packet at 612 to the AZ router. The AZ router then sends a DHCP offer at 614 to the Mobile Node. When the Mobile Node sends a DHCP request at 616 to the AZ router. The AZ router then assigns a DHCP address and provides the DHCP address in a DHCP ACK packet to the Mobile Node at 618.

In order to unorphan the orphaned host object, the AZ router sends a packet including the IP address and the MAC address to the SSG router at 620. For instance, the packet may be an ACCT start packet. The SSG router then updates the orphaned host object to include the IP address at 622. In this manner, a MAC to IP address binding is created and the orphaned host object is unorphaned. The SSG router may then acknowledge the accounting start packet at 624.

The unorphaned host object may then be deleted when no longer needed. For instance, when the Mobile Node is no longer within the vicinity of the AP or the DHCP address expires, the unorphaned host object may be deleted. In this example, when an Address Resolution Protocol (ARP) packet is not received from the Mobile Node within a specified period of time or the DHCP address expires, a packet such as an ACCT stop packet including the IP address is sent by the AZ router at 626. The SSG router then deletes the host object at 628. The SSG router may then send an acknowledgement packet at 630 acknowledging the ACCT stop packet.

As described above, when the Mobile Node's lifetime expires, or it roams away from the AP, the associated host object is deleted. Therefore, it is desirable to delete the one or more host objects that are associated with the Mobile Nodes supported by the network device when this occurs. In addition, it is also possible that the network device may be powered down, which may trigger inactivation (or deletion) of host objects maintained by the network device.

Figure 7:
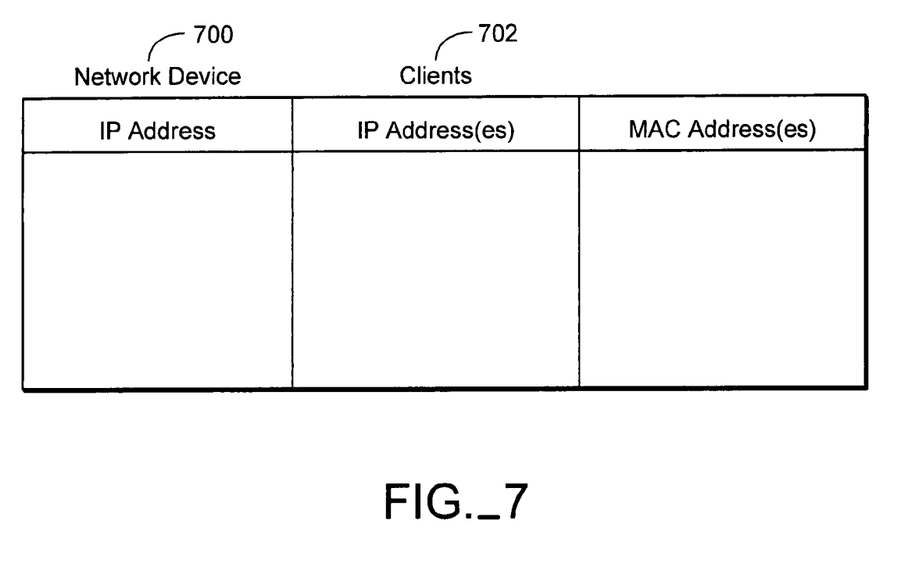
FIG. 7 is a diagram illustrating a mapping of clients supported by SSG network device in accordance with various embodiments of the invention.

In order to track the Mobile Nodes supported by the AZ router, the SSG router maintains a mapping between clients (e.g., Mobile Nodes) supported by the AZ router and an AZ router. FIG. 7 is a diagram illustrating a mapping of clients supported by a SSG network device in accordance with various embodiments of the invention. As shown, each network device 700 (e.g., AZ router and/or DHCP server) is mapped to one or more clients 702 supported by the network device 700. As shown, the network device may be identified by an IP address, while each client may be identified by an IP address as well as a MAC address. Such a mapping may be maintained for multiple AZ routers.

In order to maintain such a mapping, the IP address of the network device, as well as the IP address and MAC address of the Mobile Node, may be obtained (e.g., from the ACCT start packet). The IP address of the Mobile Node, the MAC address of the Mobile Node, and/or IP address of the network device (e.g., from the ACCT start packet) may then be added to the list of Mobile Nodes supported by the network device.

Figure 8:
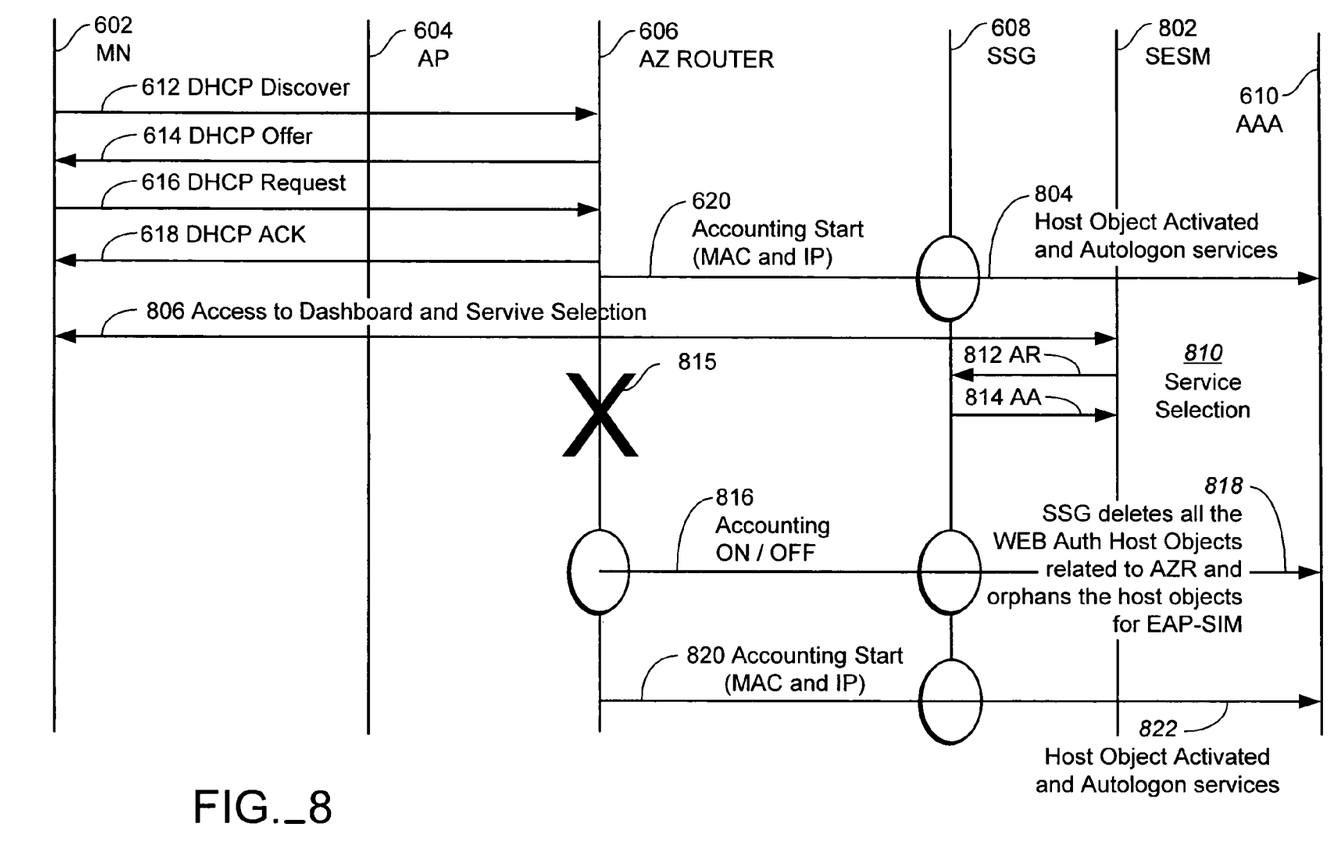
FIG. 8 is a process flow diagram illustrating a method of deleting one or more host objects associated with clients supported by an SSG network device in accordance with various embodiments of the invention.

FIG. 8 is a process flow diagram illustrating a method of deleting one or more host objects associated with clients supported by an SSG network device in accordance with various embodiments of the invention. In this example, the devices operate as described above with reference to FIG. 6. In addition, the SESM 802 operates to enable services to be selected. Specifically, when the ACCT start packet is received by the SSG router at 620, the SSG activates the host object as described above by unorphaning the orphaned host object. Once the host object is activates, autologon services are provided, enabling the Mobile Node to logon without being further authenticated. Specifically, the ACCT start packet is transmitted to the AAA server at 804, enabling the AAA server to initiate the billing for the Mobile Node.

Once the host object is activated, the Mobile Node can access the SESM to select one or more services at 806. In order to provide the selected service at 810, the SESM sends an access request packet at 812 to the SSG router. The SSG router ascertains that it has generated a host object for the Mobile Node, and sends an access accept packet to the SESM at 814.

As described above, the AZ router acts as a DHCP server. When the AZ router fails, is powered down, or reboots at 815, it sends a packet at 816 including the IP address of the AZ router that indicates that the AZ router is not functioning. For instance, the packet may be an ACCT OFF (or ACCT ON) packet. Specifically, the AZ router upon powering down may send an ACCT ON packet if the packet it previously sent was an ACCT OFF. Upon receipt of the packet, the SSG router inactivates an unorphaned host object for each of the Mobile Nodes supported by the AZ router at 818 as identified in its mapping or list of Mobile Nodes supported by the AZ router. In other words, the host objects or sessions related to the DHCP server are inactivated (e.g., orphaned). This may be accomplished, for example, through the use of an inactive timer. Inactivation may, for example, involve re-orphaning the unorphaned host objects. Inactivation prevents someone from spoofing the IP address of the Mobile Node accidentally or intentionally, and hijacking the session when the ARP lock has not been established by the AZ router/DHCP server. It is important to note that the SSG router orphans all host objects, including both web authenticated host objects and EAP-SIM host objects. Upon expiration of the inactive timer, all inactive/orphaned host objects are deleted from the SSG router. Thus, if the AZ router/DHCP server has been non-functioning for a specified period of time, the host objects supported by the AZ router/DHCP server are deleted.

In accordance with one embodiment, the Mobile Nodes are configured with a DHCP lease interval. Since the DHCP lease interval may be short, the DHCP server/AZ router renews the lease interval by sending an ACCT start packet to the SSG router and performs an ARP lock. Upon receipt of a packet such as an ACCT START packet including the MAC address and IP address of the Mobile Node from the AZ router at 820, the SSG router activates/unorphans a host object for the Mobile Node at 822, activating the host object and autologon services. Autologon services are specified in a user profile, which indicate which services in the user profile are autologon services. Autlogon services are automatically loaded when the user successfully logs on. The unorphaning occurs if the MAC address specified in the ACCT start packet matches that of the Mobile Node as specified in the list maintained by the SSG router.

The SSG router therefore intercepts packets sent between the Mobile Node and the SESM, as well as packets sent between a device such as an AZ router and AAA server. Thus, the SSG router preferably supports communication with a AAA server in order to compose, receive, and transmit packets in a protocol such as RADIUS or TACACS+.

OTHER EMBODIMENTS

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, the Access Points of this invention may be implemented in specially configured routers or servers, as well as Cisco Aironet Access Points, available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 9:
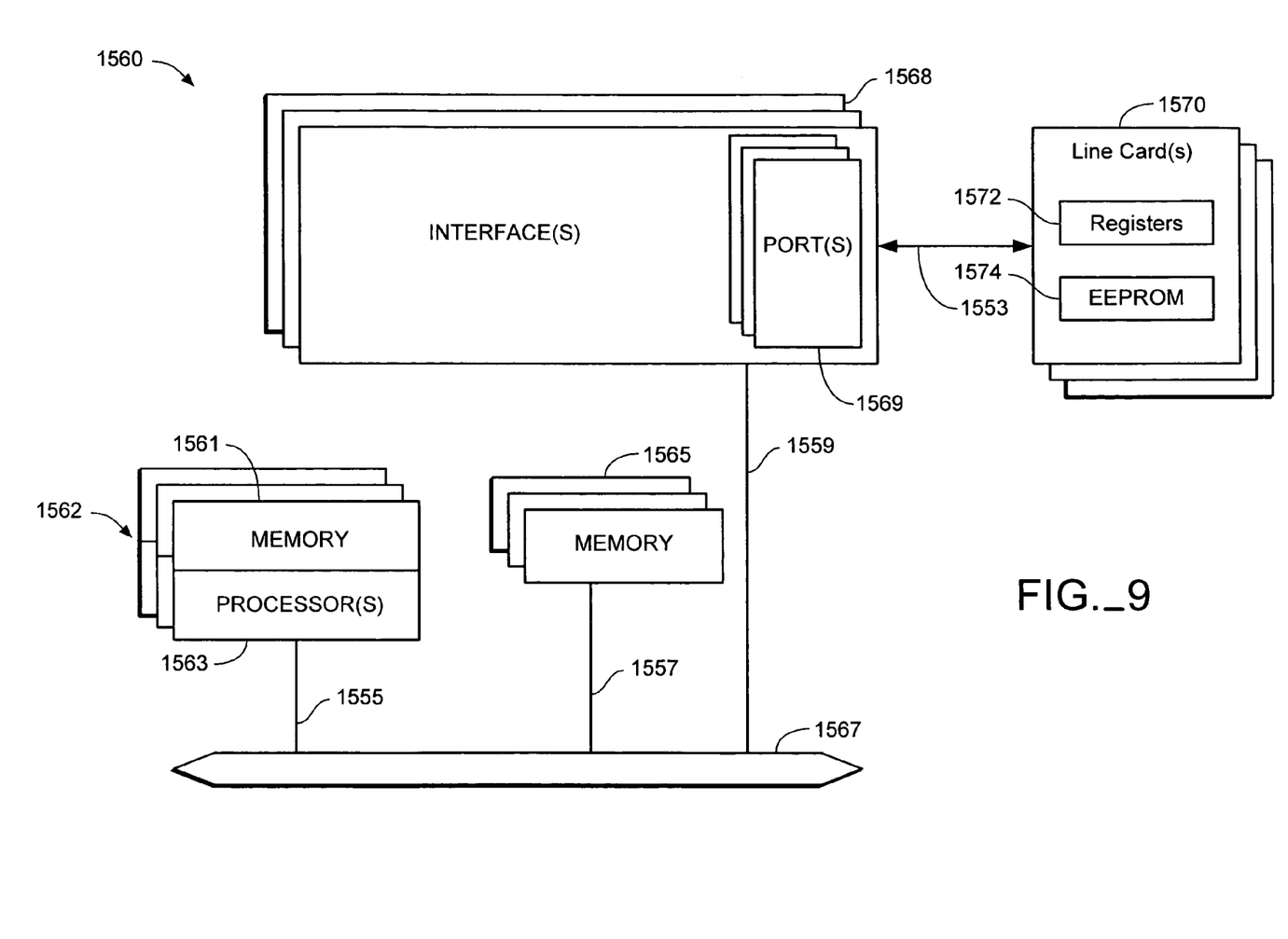
FIG. 9 is a block diagram of a network device that may be configured to implement aspects of the present invention.

Referring now to FIG. 9, a network device 1560 suitable for implementing the techniques of the present invention includes a master central processing unit (CPU) 1562, interfaces 1568, and a bus 1567 (e.g., a PCI bus). For instance, the network device 1560 may operate as an AP, AZ router, or SSG router. When acting under the control of appropriate software or firmware, the CPU 1562 may be responsible for implementing specific functions associated with the functions of a desired network device. For example, when configured as an intermediate router, the CPU 1562 may be responsible for analyzing packets, encapsulating packets, and forwarding packets for transmission to a set-top box. The CPU 1562 preferably accomplishes all these functions under the control of software including an operating system (e.g. Windows NT), and any appropriate applications software.

CPU 1562 may include one or more processors 1563 such as a processor from the Motorola family of microprocessors or the MIPS family of microprocessors. In an alternative embodiment, processor 1563 is specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

The interfaces 1568 are typically provided as interface cards (sometimes referred to as "line cards"). Generally, they control the sending and receiving of data packets over the network and sometimes support other peripherals used with the network device 1560. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1562 to efficiently perform routing computations, network diagnostics, security functions, etc.

Although not shown, various removable antennas may be used for further increase range and reliability of the access points. In addition, radio transmit power e.g., 1, 5, 20, 30, 50, and 100 mW) on the Cisco Aironet-Access Point Series is configurable to meet coverage requirements and minimize interference. In addition, a Cisco Aironet AP can be configured as a redundant hot standby to another AP in the same coverage area. The hot-standby AP continually monitors the primary AP on the same channel, and assumes its role in the rare case of a failure of the primary AP.

Although the system shown in FIG. 9 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described access points, other entities used to tunnel packets to mobile nodes on remote network segments can be used as well. For example, routers, bridges or other less intelligent packet switches may also employ the features of this invention. Moreover, although the above-described steps are disclosed as being performed in specific devices, these steps may be performed in alternate devices. For instance, the steps and devices may be modified to accommodate different protocols. Moreover, the steps described as being performed by multiple devices may be performed by a single device. For instance, the steps described as being performed by the AZ router, AP and SSG router may be performed by a single device. Accordingly, the present embodiments are to be considered as illustrative and not restrictive, and the invention is not to be limited to the details given herein, but may be modified within the scope and equivalents of the appended claims.

What is claimed is:

1. A method for performing layer 2 authentication of a Mobile Node supporting Mobile IP in an SSG-based network, comprising:

obtaining layer 2 information including at least one of a MAC address or a username associated with the Mobile Node;

performing layer 2 authentication of the Mobile Node or receiving a packet indicating that layer 2 authentication of the Mobile Node has been performed;

generating an orphaned host object including the layer 2 information, wherein the orphaned host object is generated after layer 2 authentication of the Mobile Node has been performed;

unorphaning the orphaned host object by a network device in the SSG-based network when an IP address associated with the layer 2 information is received such that the unorphaned host object includes the IP address and the layer 2 information, wherein the IP address associated with the layer 2 information is received without performing layer 3 authentication of the Mobile Node, thereby enabling layer 3 policies to be enforced without performing layer 3 authentication of the Mobile Node; and providing access to services based upon the IP address of the unorphaned host object.

2. The method as recited in claim 1, further comprising:
obtaining a username associated with the Mobile Node;
wherein the orphaned host object includes the username associated with the Mobile Node.

3. The method as recited in claim 1, wherein obtaining layer 2 information comprises:

receiving the layer 2 information in an access request packet;
wherein generating the orphaned host object is performed when an access accept packet is received indicating the Mobile Node associated with the layer 2 information has been authenticated by a AAA server.

4. The method as recited in claim 1, wherein unorphaning the orphaned host object comprises:
receiving a packet including the IP address and the layer 2 information; and
updating the orphaned host object to include the IP address, thereby generating an unorphaned host object.

5. The method as recited in claim 4, wherein receiving a packet including the IP address and the layer 2 information comprises:
receiving an ACCT start packet including the IP address and the layer 2 information.

6. The method as recited in claim 5, further comprising:
receiving an ACCT stop packet including the IP address; and
deleting the unorphaned host object when the ACCT stop packet is received.

7. The method as recited in claim 1, further comprising:
deleting the unorphaned host object.

8. The method as recited in claim 7, further comprising:
receiving an ACCT stop packet including the IP address;
wherein deleting the unorphaned host object is performed when the ACCT stop packet is received.

9. The method as recited in claim 4, wherein the packet including the IP address and layer 2 information further includes an IP address of a network device from which the packet was received, the method further comprising:
maintaining a mapping between the IP address of the network device and the IP address of the Mobile Node such that a mapping of one or more Mobile Nodes supported by the network device is maintained.

10. The method as recited in claim 9, wherein the packet including the IP address and the layer 2 information is an ACCT start packet.

11. The method as recited in claim 9, further comprising:
receiving a packet including the IP address of the network device that indicates that the network device is not functioning; and
deleting an unorphaned host object or orphaning a host object for each of the Mobile Nodes supported by the network device.

12. The method as recited in claim 11, wherein the packet including the IP address of the network device that indicates that the network device is not functioning is an ACCT-OFF packet.

13. The method as recited in claim 11, wherein the packet including the IP address of the network device that indicates that the network device is not functioning is an ACCT-ON packet.

14. A machine-readable medium storing thereon program instructions for performing layer 2 authentication of a Mobile Node supporting Mobile IP in an SSG-based network, comprising:
instructions for obtaining layer 2 information including at least one of a MAC address or a username associated with the Mobile Node;
instructions for generating an orphaned host object including the layer 2 information, wherein the orphaned host object is generated when layer 2 authentication of the Mobile Node has been successfully performed; and
instructions for unorphaning the orphaned host object when an IP address associated with the layer 2 information is received such that the unorphaned host object includes the IP address and the layer 2 information, wherein the IP address associated with the layer 2 information is received without performing layer 3 authentication of the Mobile Node, thereby enabling layer 3 policies to be enforced without performing layer 3 authentication of the Mobile Node, wherein unorphaning the orphaned host object is performed without receiving information from a user via the SSG-based network.

15. An apparatus for performing layer 2 authentication of a Mobile Node supporting Mobile IP in an SSG-based network, comprising:
a processor; and
means for obtaining layer 2 information including at least one of a MAC address or a username associated with the Mobile Node;
means for performing layer 2 authentication of the Mobile Node using at least a portion of the layer 2 information or receiving a packet indicating that layer 2 authentication of the Mobile Node has been performed;
means for generating an orphaned host object including the layer 2 information, wherein the orphaned host object is generated when layer 2 authentication of the Mobile Node has been performed; and
means for unorphaning the orphaned host object when an IP address associated with the layer 2 information is received such that the unorphaned host object includes the IP address and the layer 2 information, wherein the IP address associated with the layer 2 information is received without performing layer 3 authentication of the Mobile Node, thereby enabling layer 3 policies to be enforced without performing layer 3 authentication of the Mobile Node, wherein unorphaning the orphaned host object is performed without receiving login information from a user via the SSG-based network.

16. An apparatus for performing layer 2 authentication of a Mobile Node supporting Mobile IP in an SSG-based network, comprising:
a processor; and
a memory, at least one of the processor or the memory being adapted for:
obtaining layer 2 information including at least one of a MAC address or a username associated with the Mobile Node;
performing layer 2 authentication of the Mobile Node using at least a portion of the layer 2 information or receiving a packet indicating that layer 2 authentication of the Mobile Node has been performed;
generating an orphaned host object including the layer 2 information, wherein the orphaned host object is generated when layer 2 authentication of the Mobile Node has been performed; and
unorphaning the orphaned host object when an IP address associated with the layer 2 information is received such that the unorphaned host object includes the IP address and the layer 2 information, wherein the IP address associated with the layer 2 information is received without performing layer 3 authentication of the Mobile Node, thereby enabling layer 3 policies to be enforced without performing layer 3 authentication of the Mobile Node, wherein unorphaning the orphaned host object is performed without receiving login information from a user via the SSG-based network.

17. The apparatus as recited in claim 16, at least one of the processor or the memory being further adapted for:

enforcing layer 3 policies based upon the layer 2 authentication of the Mobile Node.

18. The apparatus as recited in claim 16, at least one of the processor or the memory being further adapted for:
   enforcing layer 3 policies without performing layer 3 authentication.

19. The apparatus as recited in claim 16, at least one of the processor or the memory being further adapted for:
   enforcing layer 3 policies by accessing the unorphaned host object.

20. The apparatus as recited in claim 16, at least one of the processor or the memory being further adapted for:
   enforcing layer 3 policies based upon the IP address of the unorphaned host object.

21. The method as recited in claim 1, wherein performing Layer 2 authentication of the Mobile Node is performed using an EAP-SIM protocol.

22. The method as recited in claim 1, wherein layer 2 authentication of the Mobile Node is performed using a LEAP protocol.

23. The apparatus as recited in claim 16, wherein layer 2 authentication of the Mobile Node is performed using an EAP-SIM protocol.

* * * * *